US008208535B2

(12) United States Patent
Divorra Escoda et al.

(10) Patent No.: US 8,208,535 B2
(45) Date of Patent: Jun. 26, 2012

(54) VIDEO CODING METHOD OF EXPLOITING THE TEMPORAL REDUNDANCY BETWEEN SUCCESSIVE FRAMES

(75) Inventors: Oscar Divorra Escoda, Lausanne (CH); Michel Bierlaire, Lausanne (CH); Pierre Vandergheynst, Lausanne (CH); Julien Reichel, Renens (CH); Francesco Ziliani, Lausanne (CH)

(73) Assignee: UTC Fire & Security Suisse SARL, Ecublens (CH)

( * ) Notice: Subject to any disclaimer, the term of this patent is extended or adjusted under 35 U.S.C. 154(b) by 1579 days.

(21) Appl. No.: 10/540,773

(22) PCT Filed: Dec. 17, 2003

(86) PCT No.: PCT/IB03/06141
§ 371 (c)(1),
(2), (4) Date: Dec. 2, 2005

(87) PCT Pub. No.: WO2004/059984
PCT Pub. Date: Jul. 15, 2004

(65) Prior Publication Data
US 2006/0203906 A1    Sep. 14, 2006

(30) Foreign Application Priority Data

Dec. 30, 2002    (EP) .................................... 02406150

(51) Int. Cl.
*H04N 7/12* (2006.01)
(52) U.S. Cl. .......... 375/240.03; 375/240.23; 375/240.12
(58) Field of Classification Search .............. 375/240.03
See application file for complete search history.

(56) References Cited

U.S. PATENT DOCUMENTS

| 5,448,310 A * | 9/1995 | Kopet et al. .................... 348/699 |
| 7,245,659 B2 * | 7/2007 | Sekiguchi et al. ........ 375/240.12 |
| 2002/0114393 A1 * | 8/2002 | Vleeschouwer ......... 375/240.16 |

OTHER PUBLICATIONS

Frossard, P; Vanderhynst, P. Redundancy-Driven a Posteriori Matching Pursuit Quantization, Department of Electrical Engineering Signal Processing Laboratory, Lausnne, Oct. 2000 p. 1-42.*
Neff, R.; Zakhor, A "A very Low Bit Rate Video Coding Method Based on Matching Pursuits" IEEE Transactions of Circuits and Systems for Technology, IEEE Inc, New York, US vol. 7 No. 1 Feb. 1, 1997 p. 158-171.*
F. Moschetti et al., "New dictionary and fast atom searching method for matching pursuit representation of displaced frame difference", Proceedings of the 2002 IEEE International Conference on Image Processing, vol. 3, Sep. 22-25, 2002, Rochester, New York, pp. 685-688.
R. Neff et al., "Very Low Bit-Rate Video Coding Based on Matching Pursuits", IEEE Transactions on Circuits and Systems for Video Technology, III Inc., New York, vol. 7, No. 1, Feb. 1, 1997, pp. 158-171.
P. Vandergheynst et al., "Efficient image representation by anisotropic refinement in matching pursuit", Proceedings of the 2001 IEEE International Conference on Acoustics, Speech, and Signal Processing (ICASSP '01), vol. 3, May 7-11, 2001, Salt Lake City, Utah, pp. 1757-1760.
S. G. Mallat et al., "Matching pursuits with time-frequency dictionaries", IEEE Transactions on Signal Processing, IEEE, Inc., New York, vol. 41, No. 12, Dec. 1993, pp. 3397-3415.

* cited by examiner

*Primary Examiner* — Jayanti K Patel
*Assistant Examiner* — Jessica Prince
(74) *Attorney, Agent, or Firm* — MH2 Technology Law Group, LLP

(57) ABSTRACT

The invention relates to a video coding method of exploiting the temporal redundancy between successive frames in a video sequence. A reference frame, called I-frame, is first approximated by a collection of geometric features, called atoms. The following predicted frames called, P-frames, are approximated by the geometric transformations of the geometric features (atoms) describing the previous frame. Preferably, the I-frame is approximated by a linear combination of N atoms (formula), selected in a redundant, structured library. They are indexed by a string of parameters representing the geometric transformations applied to the generating mother function g(x,y) and the cn are weighting coefficients.

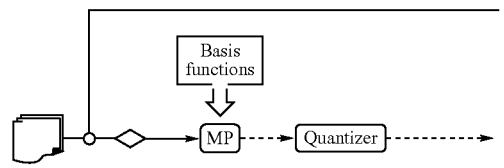

-continued

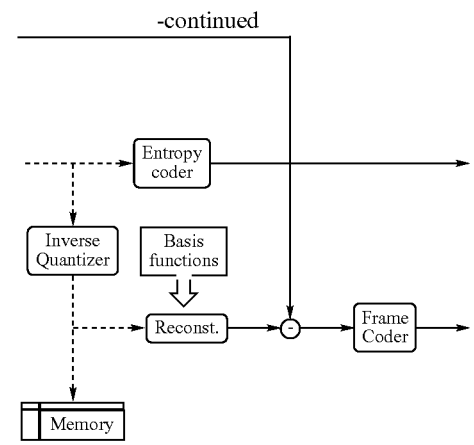

16 Claims, 4 Drawing Sheets

VIDEO CODING METHOD OF EXPLOITING THE TEMPORAL REDUNDANCY BETWEEN SUCCESSIVE FRAMES

This disclosure is based upon European Application No. 02406150.9 filed Dec. 30, 2002, and International Application No. PCT/IB2003/006141, filed Dec. 17, 2003, the contents of which are incorporated by reference.

BACKGROUND OF THE INVENTION

The present invention relates to a video coding method of exploiting the temporal redundancy between successive frames in a video sequence.

Efficiently encoding video or moving pictures relies heavily on exploiting the temporal redundancy between successive frames in a sequence. Based on the assumption that local motions are slow with respect to the temporal sampling period, several techniques have been proposed for efficiently removing this redundancy. The most successful and acclaimed method is block-based motion prediction, heavily used in nowadays standards such as MPEG4 and H.26L. Roughly speaking, these compression scheme predict a frame in the sequence based on the knowledge of previous frames. The current frame (or predicted) is cut into blocks of fixed size and the best matching block is searched in the reference frame. Displacement vectors are then encoded so that the decoder can reconstruct the prediction of the current frame from the previously decoded frame(s). As the block-based prediction is not accurate enough to encode perfectly the current frame, the error between the original and the predicted frame is encoded separately. This is in general referred to as texture coding or motion residual coding. The main drawback of this method lies in the blocky nature of the prediction mechanism, which gives rise to very noticeable blocky artefacts at low bit rates. Moreover such a system, while well suited for wide translational motions, is unable to cope with locally complex movements or even global geometric transformations such as zoom or rotation. Finally, block based motion prediction is not able to follow natural features of images since it is stuck in a fixed framework based on artificial image primitives (blocks).

SUMMARY OF THE INVENTION

This invention propose to solve the above-mentioned problems by introducing a new paradigm for dealing with spatio-temporal redundancy.

The method according the invention exploits the temporal redundancy between successive frames in a video sequence. A reference frame, called an I-frame, is first approximated by a collection of basis functions, called atoms. Either the atoms are quantized, entropy coded and sent to a decoder, or the original I-frame is encoded and transmitted to the decoder using any frame codec. Subsequent predicted frames, called P-frames, are approximated by the geometric transformations of the basis functions (atoms) describing the previous frame. The parameters of the geometric transformation are quantized, entropy coded and sent to a decoder in order to reconstruct the predicted frames.

BRIEF DESCRIPTION OF THE DRAWINGS

The invention will be described with the help of accompanying representations.

DETAILED DESCRIPTION

Figure 1:
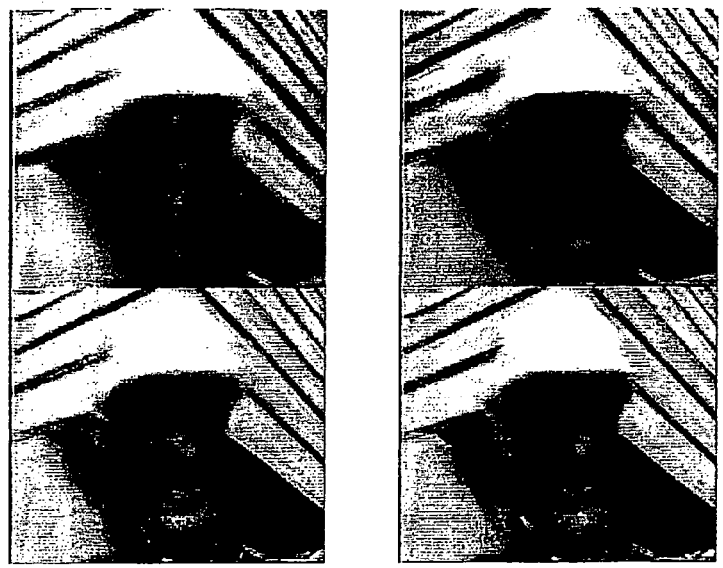
FIG. 1: shows the progressive reconstruction of an I frame with 50, 100, 150 and 200 atoms.

The proposed method is composed of two main parts. In a first step, a geometric model of a reference frame is built. In the second step, the model is updated by deformations in order to match successive frames.

A reference frame (or intra frame, I-frame) is first decomposed into a linear combination of basis functions (atoms) selected in a redundant, structured library (see. P. Vandergheynst and P. Frossard, Efficient image representation by anisotropic refinement in matching pursuit, in Proceedings of IEEE ICASSP, Salt Lake City Utah, May 2001, vol. 3, the content of which is incorporated herein by reference)

$$I(x, y) = \sum_{n=0}^{N-1} c_n g_{\gamma_n}(x, y),$$

In this equation, $I(x,y)$ is the Intensity of the I-frame represented as a function giving the gray level value of the pixel at position $(x,y)$. $c_n$ are weighting coefficients and $g_{\gamma_n}(x,y)$ are the atoms involved in the decomposition. These atoms are image patches generated by a simple mathematical formula expressing the gray level value at pixel position $(x,y)$. The formula is built by applying geometric transformations to a function $g(x,y)$ that we call a generating mother function. The parameters of these transformations are concatenated in the vector of parameters $\gamma$. Examples of possible transformations are translations, rotations or dilations. They act on the generating mother function by change of variable, for example:

Translations: $g_b(x,y) = g(x-b_1, y-b_2)$

Dilation: $g_a(x,y) = a^{-1} g(x/a, y/a)$

Translations, anisotropic dilations and rotations:

$$g_\gamma(x, y) = \frac{1}{\sqrt{a_1 a_2}} g(x_n, y_n), \text{ where}$$

$$x_n = \frac{\cos\vartheta(x-b_1) - \sin\vartheta(y-b_2)}{a_1}$$

$$y_n = \frac{\sin\vartheta(x-b_1) + \cos\vartheta(y-b_2)}{a_2},$$

and $\gamma = [a_1, a_2, b_1, b_2, \theta]$, are the parameters of this transformation.

Generating mother functions are chosen almost arbitrarily. Their properties can be adapted to the specific application. A possible example is to select an oscillating function of the form:

$$g(x, y) = (1 - x^2)\exp\left(-\frac{x^2 + y^2}{2}\right)$$

The decomposition can for example be accomplished using a Matching Pursuit (see S. Mallat and Z. Zhang, Matching Pursuits with time-frequency dictionaries, IEEE Transactions on Signal Processing, 41(12):3397-3415, December 1993, the content of which is incorporated herein by reference). Matching Pursuit (MP) is a greedy algorithm that iteratively decomposes the image using the following scheme. First the atom that best matches the image is searched by maximizing the scalar product between the image and the dictionary $\langle I | g_r \rangle$, and a residual image is computed:

$$I = \langle I | g_{r_0} \rangle g_{R_0} + R_1.$$

Then the same process is applied to the residual:

$$R_1 = \langle R_1 | g_{r_1} \rangle g_{r_1} + R_2,$$

and iteratively:

$$R_n = \langle R_n | g_{r_n} \rangle g_{r_n} + R_{n+1}.$$

Finally this yields a decomposition of the image in terms of a sum of atoms:

$$I(x) = \sum_{n=0}^{N-1} \langle R_n | g_{\gamma_n} \rangle g_{\gamma_n}(x) + R_N(x).$$

The basis functions (atoms) are indexed by a string of parameters $\gamma_n$ representing geometric transformations applied to a generating mother function g(x,y). This index can be seen as a point on a manifold. The set of geometric transformations is designed in such a way that the total collection of basis functions (atoms) is a dense subspace of $L^2$ ($R^2$), i.e. any image can be exactly represented.

This part of the method expresses the I-frame as a collection of atoms that can be seen as geometric features such as edges or parts of objects which are very noticeable by the human eye. These basic primitives hereafter referred to as atoms, form a primal sketch of the image. The atoms are modelled and fully represented by the set of coefficients and parameters $\{c_n, \gamma_n, n=0, \ldots, N-1\}$, where $c_n$ is the coefficient and $\gamma_n$ is a vector of parameters.

Figure 2:
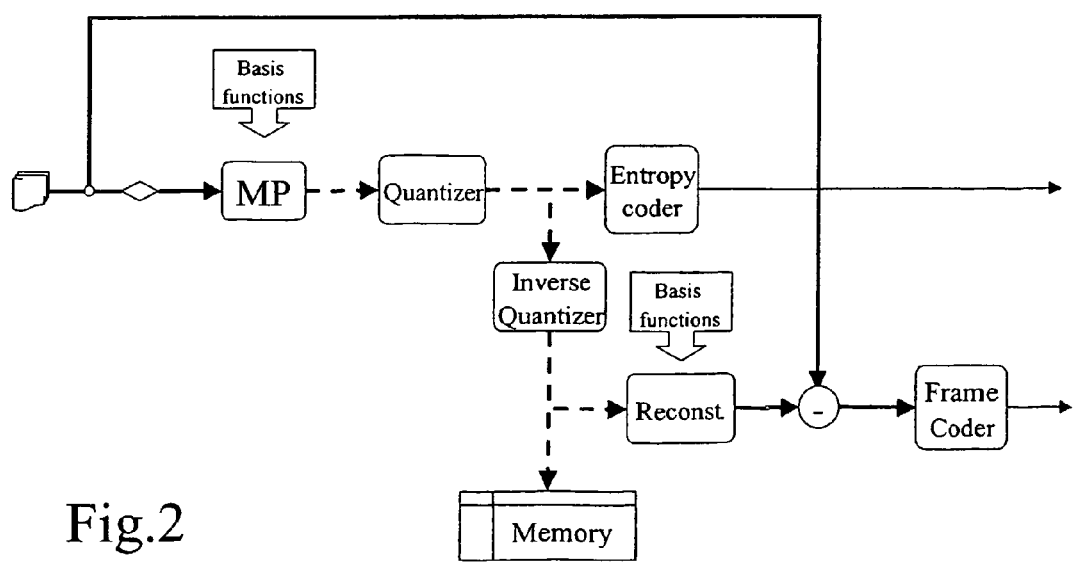
FIG. 2: shows a flow-chart of the I-frames codec, where the atoms are used to transmit the frame.

There are two ways to handle the coding of the I-frames. The first one is to estimate the atoms of the original frame. The atoms modelling the I frame are then quantized, entropy coded and sent in the bitstream. The process of quantizing an atom corresponds to the quantization of its coefficient and parameters. The atoms are also stored in memory in order to be used for the prediction of the next frames. A flowchart of this procedure is shown in FIG. 2, where the atoms are used to transmit the frame. Dotted lines represent the coefficients and parameters of the atoms, the bold solid line represents a video frame and the light solid line represents bitstreams. The flowchart should be understood as follow: The input frame is decomposed into atom using the MP algorithm. The atoms are then quantized and entropy. They are also de-quantized and stored in memory for the prediction of the next frames. Those de-quantized atom parameters are used to reconstruct the image, with the help of the generating mother function (which is known both by the encoder and decoder). Finally the difference between the original frame and the reconstructed one is computed and encoder using the frame coder.

Note that the figure includes an optional step, that encodes the motion residuals (or texture), which is the difference between the original frame and the one reconstructed using the atoms. This encoding can be used to further increase the quality of the decoded image up to a lossless reconstruction.

Figure 3:
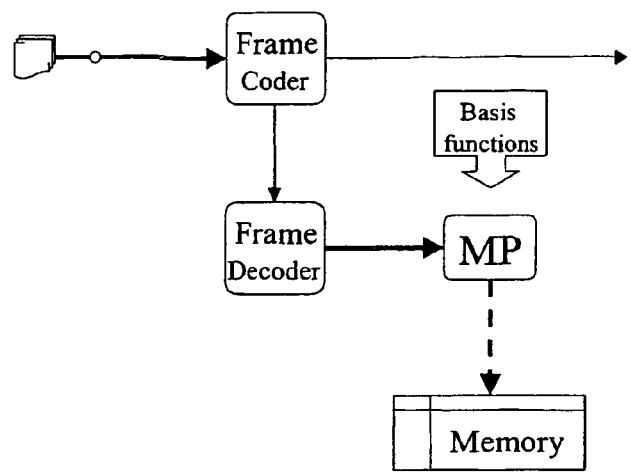
FIG. 3: shows a flow-chart of the I-frames codec, where the atoms are estimated from the coded image both at the encoder and decode.

The second way of handling the I-frames is more conventional. The original frame is encoded and transmitted using any frame codec. Then the atoms are estimated from the reconstructed frame, both at the encoder and at the decoder. Finally those atoms are stored in memory for the prediction of future frames. The flowchart of this procedure is shown in FIG. 3, where the atoms are estimated from the coded image both at the encoder and decoder. Dotted lines represent the coefficients and parameters of the atoms, the bold solid line represents a video frame and the light solid line represents bitstreams. The flow-chart should be understood as follow: The input frame is first encoder with the frame coder and send to the decoder in a bitstream. It is also decoded, in order to get the exact same frame that will be available at the decoder. This frame is decomposed into atoms by the MP algorithm. Finally those atoms are stored in memory to be used for the prediction of the next frames.

Figure 4:
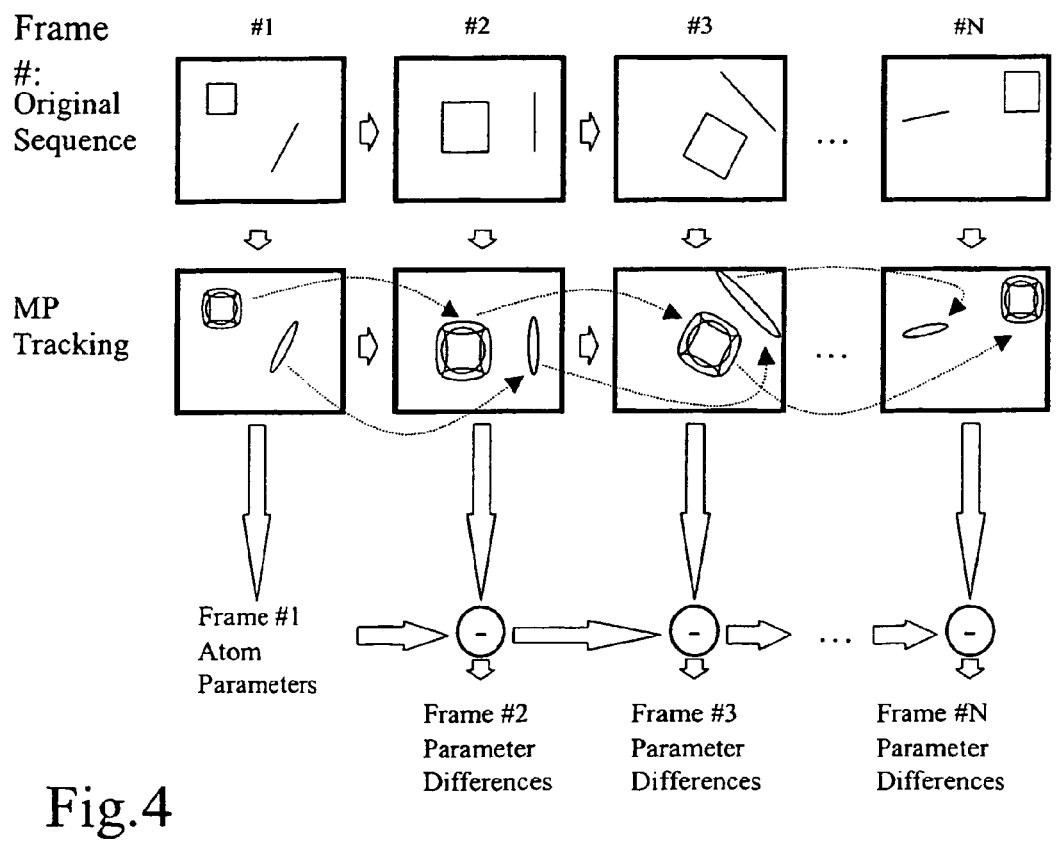
FIG. 4: shows three successive schematic updates of basis functions inside a sequence of frames

The second step of the method consists in updating the image model (the set of all atoms) in order to take into account the geometric deformations that have occurred between the reference and the current frame. Clearly, since the model is based on geometric transformations, updating its atoms allows for adapting to smooth local distortions (translations, rotations, scales are common examples). In order to compute this update, we assume that the deformed model is close enough to the reference model. We thus have to search for new atoms parameters in the proximity of the previous solution. This is performed by means of a local optimization procedure trying to minimize the mean square error between the updated model and the current frame (FIG. 4, where three successive schematic updates of basis functions (atoms) inside a sequence of frames are represented). The updated atom parameters are then the solution of:

$$\operatorname*{ArgMin}_{\{c_n, \gamma_n\}}\left\{\left\|\sum_n c_n g_{\gamma_n} - I_t\right\|\right\},$$

where the optimization method for frame $I_1$ at time t is initialized with the atom parameters corresponding to the solution at time t−1 or to the reference frame (the I frame) in order to avoid error propagation. This problem is a non-convex, non-linear, differentiable optimization problem (see Dimitri P. Bertsekas (1999) Nonlinear Programming: 2nd Edition. Athena Scientific, the content of which is incorporated herein by reference), which can be solved using various algorithms such as quasi-Newton methods, combined with line-search or trust-region globalization techniques (see Conn A., Gould N. & Toint Ph. (2000) Trust Region Methods. SIAM, the content of which is incorporated herein by reference), in order to identify a local optimum.

Figure 5:
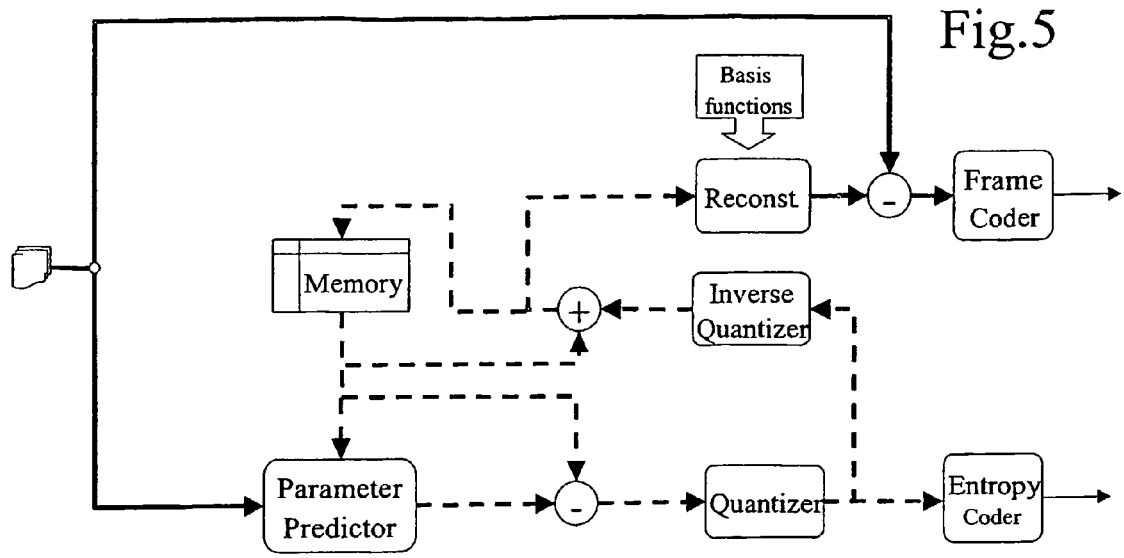
FIG. 5: shows a flow-chart of the P-frames coder, using atom based motion prediction.

The difference between the original atom parameters and the updated ones is then computed and sent together with updated atom coefficients. Quantization and entropy coding can then be performed (P. Frossard, P. Vandergheynst and R. M, Figueras y Ventura, Redundancy driven a posteriori matching pursuit quantization. ITS Technical Report 2002, the content of which is incorporated herein by reference) and a bit stream generated. This procedure is shown in detail in the flow-chart of FIG. 5. representing a flow-chart of the P-frames coder, using atom based motion prediction. Dotted lines represent the coefficients and parameters of the atoms, the bold solid line represents a video frame and the light solid line represents bitstreams. The flow-chart should be understood as follow: The input frame are passed to the parameter estimation, which will modify the atom parameters stored in memory in order for them to describe correctly the input. The difference between the new atom parameters and the one stored in memory is computed and the result is quantized and entropy coded. Those quantized difference are also de-quantized and added to the atom parameters previously stored in memory. This allows the reconstruction of the same atoms as the one available at the decoder. Those reconstructed atom parameters are then stored in memory, replacing the ones of the previous frame. They are also used to reconstruct the current frame using the generating mother function available at the encoder and decoder. The difference between this reconstruction and the original input is computed and encoded using the frame coder. The number of updated atoms and their quantization can be fixed but can also be chosen in adaptive manner through rate and distortion constraints by means of a rate controller. For each motion predicted frame, the motion residuals (or texture) can be computed and encoded using any still image codec. It would then be sent in the bitstream in order to generate a scalable stream achieving lossy to lossless compression.

Figure 6:
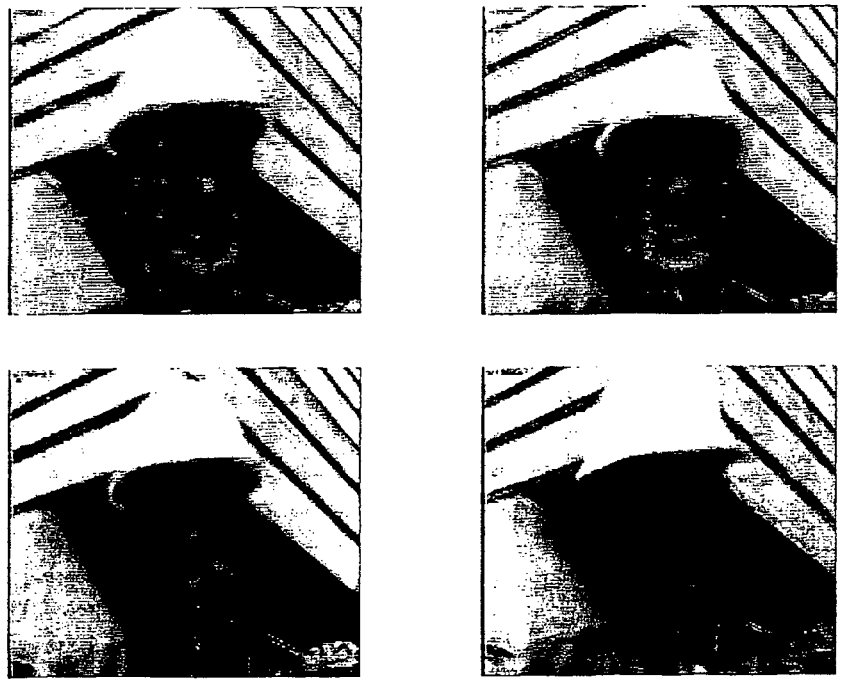
FIGS. 6 and 7: show the encoding of the Foreman sequence: I-frame, predicted frames #20, 50 and 99.

Typical results of the motion prediction, with a coding cost of 170 Kbps in average are shown in FIG. 6, where predicted frames 20, 50 and 99 are represented.

Figure 7:
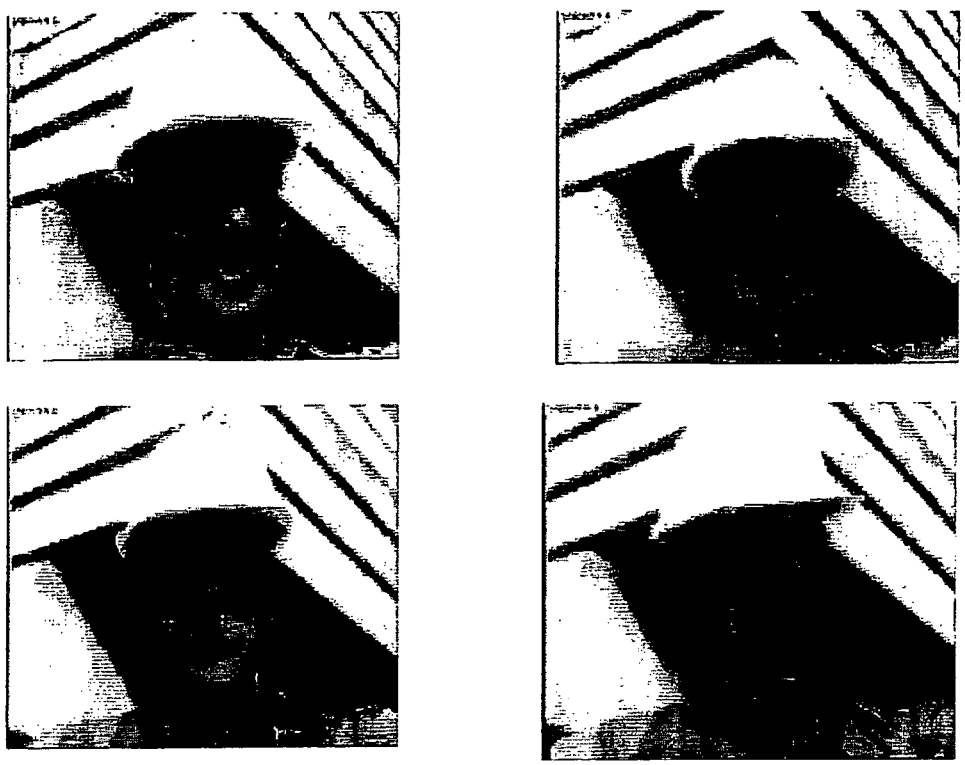

It can be seen that the motion prediction stays accurate even after 100 frames, even in the absence of encoding of the motion residual. This is the major advantage of this technique compared to block based compensation. In order to show the advantage of the new prediction technique, we have done the same experiment with typical block matching compensation. The same sequence was encoded using adaptive block compensation with block sizes of 4×4 to 32×32. The encoder automatically selected the best block size according to Rate-Distortion optimisation. By varying the block size it is possible to control the size of the compressed bitstream in order to match the result of the atom based motion prediction. Like in the case of the atom based prediction, the motion residual where not coded. The Motion prediction results of the block matching are shown in FIG. 7.

Figure 8:
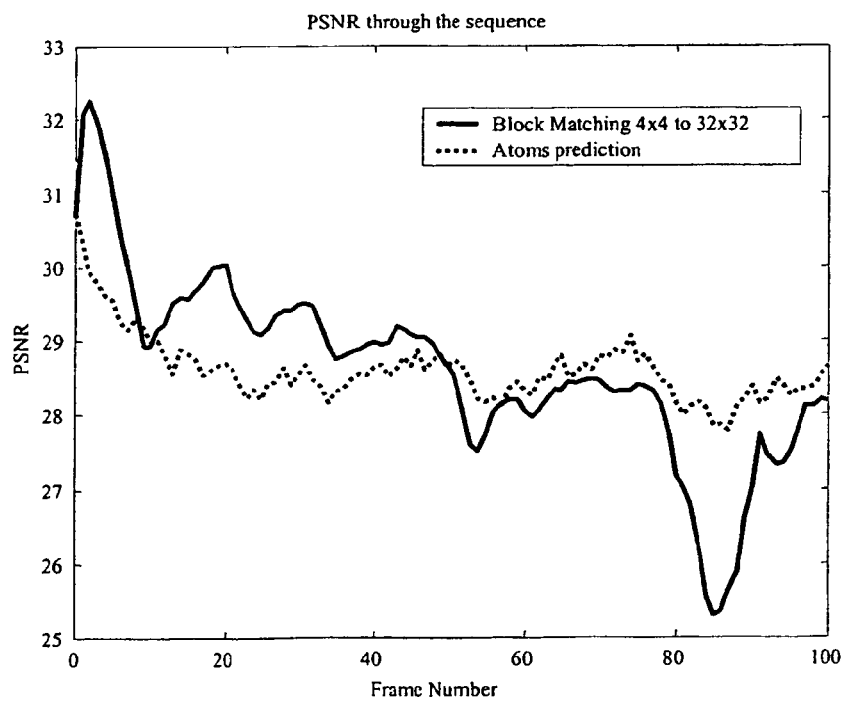
FIG. 8: represents PSNR along the encoded Foreman sequence as a function of the number of predicted frames.

Objective comparison can be done using the PSNR measure. This measure is computed using the squared difference between the original and the reconstructed frame, i.e.

$$PSNR = -10 \log\left(\frac{255^2}{\sum_{x,y}(I(x, y) - I_r(x, y))^2}\right),$$

where $I(x,y)$ is the original frame and $I_r(x,y)$ is the reconstructed frame. The PSNR comparisons of the two prediction methods, for a bitstream of average size of 170 Kbps, are shown in FIG. 8. The performance of the current atom based motion prediction is particularly good taken into consideration, that the states of the art block based motion prediction was used. Moreover, it can be seen that in the long term (more than 50 frames) the prediction of the atom based method is more constant. In typical block matching applications, the block size is limited to 8×8, which causes poorer performances for the Block Matching.

The number of predicted frames can be fixed but can also be chosen in adaptive manner through rate and distortion constraints by means of a rate controller. For instance, when abrupt changes occur (shots between scenes), the model is not an accurate base anymore and the reference I-frame can simply be refreshed in order to compute a new model. Such a refresh mechanism can be monitored by tracking frame-to-frame distortion, which should stay rather constant for smooth updates of the initial model (FIG. 8).

The invention claimed is:

1. Video coding method of exploiting temporal redundancy between successive frames in a video sequence, comprising the steps wherein a reference frame, called an I-frame, is first approximated by a collection of basis functions, called atoms, and wherein either the atoms are quantized, entropy coded, and sent to a decoder or an original I-frame is encoded and transmitted to the decoder using a frame codec, and wherein following predicted frames, called P-frames, are approximated by geometric transformations of the atoms describing a previous frame, wherein the geometric transformations include translations, anisotropic dilations, and rotations, and are applied to a generating mother function $g(x,y)$ by means of the following change of variables:

$$g_Y(x, y) = \frac{1}{\sqrt{a1a2}} g(x_n, y_n), \text{ where}$$

$$x_n = \frac{\cos\vartheta(x - b_1) - \sin\vartheta(y - b_2)}{a_1}$$

$$y_n = \frac{\sin\vartheta(x - b_1) + \cos\vartheta(y - b_2)}{a_2}$$

and wherein parameters of the geometric transformation are quantized, entropy coded, and sent to the decoder in order to reconstruct the predicted frames.

2. Video coding method according to claim 1, wherein the collection of atoms is a decomposition of the I-frame obtained using a Matching Pursuit algorithm.

3. Video coding method according to claim 1, wherein parameters and coefficients of the atoms are quantized and entropy coded.

4. Video coding method according to claim 3, wherein the quantization of the parameters and the coefficients vary across time, and the variation is controlled by a rate control unit.

5. Video coding method according to claim 1, further comprising using a residual frame based texture codec that encodes differences between original frames and the frames reconstructed using compensated atoms.

6. Video coding method according to claim 1, wherein the atoms of the I-frame are computed from quantized frames at an encoder and the decoder and are not transmitted.

7. Video coding method according to claim 1, wherein the atoms are re-computed after each quantized frame at an encoder and decoder and replace a previous prediction.

8. Video coding method according to claim 1, wherein the generating mother function is of the following form:

$$g(x, y) = (1 - x^2)\exp\left(-\frac{x^2 + y^2}{2}\right).$$

9. Video coding method according to claim 1, wherein the I-frame is approximated by a linear combination of N atoms $g_{\gamma n}(x,y)$:

$$I(x, y) = \sum_{n=0}^{N-1} c_n g_{\gamma n}(x, y),$$

selected in a redundant, structured library and indexed by a string of parameters $\gamma_n$ representing the geometric transformations applied to the generating mother function $g(x,y)$ Where $c_n$ are weighting coefficients.

10. An apparatus for video coding, the apparatus comprising:
a memory containing instructions; and
a processor, operably connected to the memory, that executes the instructions to perform operations comprising:
approximating a reference frame, called an I-frame, using a collection of basis functions, called atoms;
performing one of a group comprising:
quantizing and entropy coding the atoms and transmitting to a decoder, and
encoding an original I-frame and transmitting to the decoder using a frame codec;
approximating following predicted frames, called P-frames, by geometric transformations of the atoms describing a previous frame, wherein the geometric transformations include translations, anisotropic dilations, and rotations; and
applying the predicted frames to a generating mother function $g(x,y)$ by means of the following change of variables:

$$g_y(x, y) = \frac{1}{\sqrt{a1a2}} g(x_n, y_n), \text{ where}$$

$$x_n = \frac{\cos\vartheta(x - b_1) - \sin\vartheta(y - b_2)}{a_1}$$

$$y_n = \frac{\sin\vartheta(x - b_1) - \cos\vartheta(y - b_2)}{a_2}$$

wherein parameters of the geometric transformation are quantized, entropy coded, and sent to the decoder in order to reconstruct the predicted frames.

11. The apparatus of claim 10, wherein the collection of atoms is a decomposition of the I-frame obtained using a Matching Pursuit algorithm.

12. The apparatus of claim 10, wherein parameters and coefficients of the atoms are quantized and entropy coded.

13. The apparatus of claim 12, wherein thequantization of the parameters and the coefficients vary across time, and the variation is controlled by a rate control unit.

14. The apparatus of claim 10, the operations further comprising:
using a residual frame based texture codec that encodes differences between original frames and the frames reconstructed using compensated atoms.

15. The apparatus of claim 10, wherein the atoms of the I-frame are computed from quantized frames at an encoder and the decoder and are not transmitted.

16. The apparatus of claim 10, wherein the atoms are re-computed after each quantized frame at an encoder and decoder and replace a previous prediction.

* * * * *